United States Patent
Bohata

[11] Patent Number: 5,816,764
[45] Date of Patent: Oct. 6, 1998

[54] VEHICLE FOR LIFTING AND TRANSPORTING CONTAINERS

[76] Inventor: John F. Bohata, 45 Nowick La., Smithtown, N.Y. 11787

[21] Appl. No.: 646,978

[22] Filed: May 8, 1996

[51] Int. Cl.$^6$ .................................................. B65G 67/02
[52] U.S. Cl. .......................... 414/477; 414/491; 414/542
[58] Field of Search .................. 414/471, 477, 414/478, 479, 491, 496, 541, 542, 544, 628, 629, 631, 632, 637, 642

[56] References Cited

U.S. PATENT DOCUMENTS

| | | |
|---|---|---|
| Re. 23,546 | 9/1952 | Dempster .................................. 414/544 |
| 2,092,663 | 9/1937 | Bach . |
| 2,126,289 | 8/1938 | Schroeder . |
| 2,437,806 | 3/1948 | Dempster . |
| 2,542,425 | 2/1951 | Oliver . |
| 2,599,524 | 6/1952 | Lehmann . |
| 2,603,368 | 7/1952 | Vance . |
| 3,235,105 | 2/1966 | Loomis ..................................... 414/544 |
| 3,521,780 | 7/1970 | Cook ........................................ 414/632 |
| 3,971,486 | 7/1976 | Carlsson . |
| 4,023,690 | 5/1977 | Goode .................................. 414/477 X |
| 4,219,298 | 8/1980 | Stragier et al. . |
| 4,325,666 | 4/1982 | Chain et al. ......................... 414/471 X |
| 4,415,302 | 11/1983 | Brouwer et al. .................... 414/631 X |
| 4,690,610 | 9/1987 | Fotheringham . |
| 4,753,313 | 6/1988 | Fröroth ................................ 414/471 X |
| 4,778,327 | 10/1988 | Tufenkian et al. . |
| 4,943,203 | 7/1990 | Bohata . |
| 5,082,090 | 1/1992 | Walker . |
| 5,391,043 | 2/1995 | Bohata et al. . |
| 5,618,150 | 4/1997 | Poindexter ......................... 414/478 X |

FOREIGN PATENT DOCUMENTS

3621366A1  1/1988  Germany .

*Primary Examiner*—James W. Keenan
*Attorney, Agent, or Firm*—Galgano & Burke

[57] ABSTRACT

A vehicle including a bed for lifting and transporting a fully loaded container such as a dumpster. A pair of hydraulic cylinders are attached to the bed and to a chassis of the vehicle to pivot the bed between a generally horizontal transporting position and a generally vertical lifting position. A mast is attached to a carriage which is movable along a length of the bed. A pair of hydraulic cylinders operably attached to the carriage and mast pivot the mast so as to maintain the mast in a generally vertical lifting and transporting position when the bed is pivoted between the generally horizontal transporting position and a generally vertical lifting position. A fork is attached to the mast for engaging a container. A screw gear is operably attached to the carriage to both lift a fully loaded container when the bed is in a generally vertical lifting position and to position the fully loaded container on the bed.

20 Claims, 5 Drawing Sheets

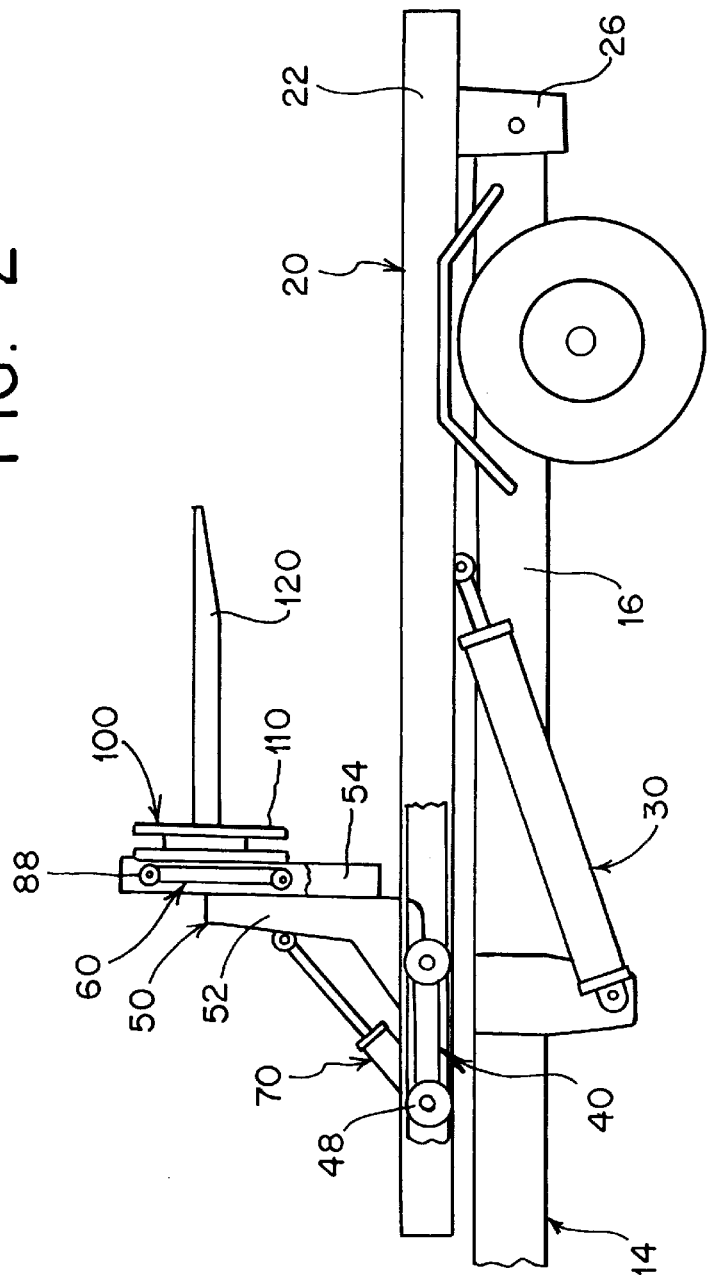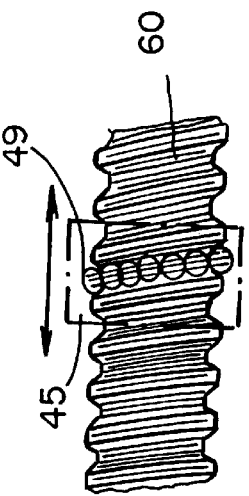

VEHICLE FOR LIFTING AND TRANSPORTING CONTAINERS

BACKGROUND OF THE INVENTION

The present invention relates to vehicles for lifting and transporting containers. More particularly, the invention relates to vehicles having a bed pivotally attachable to the vehicle in which the bed is operable to both lift and safely position a container thereon.

Containers such as dumpsters have become widely used for containing trash and garbage. Trucks having a front-end loader type mechanism are often used to follow a route on a regular basis, stopping at each container to collect the contents therein. In particular, the front-end loader type mechanism engages and raises the container to tilt and empty the contents into the truck.

With the widespread use of trash containers such as dumpsters, collectors have found it economical to pick up and transport fully loaded containers to a central site where the contents are consolidated and placed in elongated roller-type containers which are then transported to a recycling or disposal site. In particular, due to the high cost of trucks having a front end loader type mechanism, many collectors have resorted to using smaller lower costing vehicles which have a rear-mounted type mechanism for transporting fully loaded containers. However, such vehicles having a rear-mounted type mechanism are designed to carry empty containers from one location to another, and transporting fully loaded containers creates a safety hazard. Specifically, the fully loaded container ex tends and overhangs the rear wheels of the vehicle reducing the weight distribution on the front wheels, and thus, results in a decrease in the ability to steer the vehicle. In fact, many states are aware of this situation and require warning flags during the day and lights at night attached to the container when transporting empty containers with this type of vehicle. In addition, many states have made it illegal to transport fully loaded containers with vehicle.

Mechanisms for loading and transporting a container on a bed of a vehicle so that it does not overhang the rear end thereof include U.S. Pat. No. 4,778,327 to Tufenkian et al. and U.S. Pat. No. 4,943,203 to Bohata.

U.S. Pat. No. 4,778,327 to Tufenkian et al. discloses a container lifting mechanism which is mounted on a fixed flat bed of a vehicle. The lifting mechanism includes a track extending along the length of the bed, a tray which can be moved along the length of the track, and a jack-up assembly (fork lift) attached to and supported by the tray. A pair of hydraulic cylinders attached between the tray and the jack-up assembly permit forward tilting of the jack-up assembly toward the vehicle cab. In use, the tray carrying the jack-up assembly is moved to the rear of the vehicle. The fork is lowered below the bed and the vehicle is backed towards a container until the fork engages sleeves in the container. The fork is then raised, lifting the container above the bed. The tray is moved by hydraulic ram towards the truck cab and the jack-up assembly is tilted toward the cab.

U.S. Pat. No. 4,943,203 to Bohata discloses a vehicle mounted container lifting mechanism with the added ability to tilt the bed about 30 degrees by pivotally attaching the bed to the chassis above the rear wheel of the vehicle for the purpose of enabling the lifting fork to be brought closer to the ground. See also, U.S. Pat. No. 3,971,486 to Carlsson which discloses a vehicle for transporting roller-type containers in which a fork lift device is attached to a frame that is pivoted between a vertical position and a position coplanar with the chassis of the vehicle.

Although suitable for their intended use, the above prior art references are costly and have limited capability for lifting fully loaded containers. Specifically, these devices provide separate means for 1) lifting containers and 2) positioning the container on the bed.

There is a need for a low cost vehicle for lifting and safely transporting fully loaded containers.

SUMMARY OF THE INVENTION

Accordingly, it is therefore an object of the present invention to provide a vehicle for lifting and transporting containers in which the vehicle is low cost, reliable, and operable to lift and safely transport fully loaded containers on a vehicle.

It is also an object of the present invention to provide a vehicle for lifting and transporting containers in which the vehicle includes a pivotable bed positionable between a generally horizontal transporting position and a generally vertical lifting position.

It is another object of the present invention to provide a vehicle for lifting and transporting containers in which the vehicle includes a pivotable lifting bed, preferably having screw drive means, operable to both 1) lift and 2) position a fully loaded container on the bed of the vehicle.

It is still another object of the present invention to provide a vehicle for lifting and transporting containers in which the vehicle enables a fully loaded container to be positioned generally between the front and rear wheels thereof.

Certain of the foregoing and related objects are readily attained in a vehicle for lifting and transporting containers in which the vehicle includes a bed pivotally attached to a vehicle so that the bed is pivotable between a generally horizontal transporting position and a generally vertical lifting position, and means for pivoting the bed between the generally horizontal transporting position and the generally vertical lifting position. In addition, a carriage is movable along a length of the bed, a mast is pivotally attached to the carriage, and a fork is attached to the mast for engaging a container. means for pivoting the mast is provided to maintain the mast in a generally vertical orientation when the bed is pivoted between the generally horizontal transporting position and the generally vertical lifting position. Also provided is means for lifting a container when the bed is in the generally vertical lifting position and for moving the carriage along the length of the bed to position a container thereon.

Preferably, the means for moving the carriage along the length of the bed comprises a screw gear, and the carriage comprises a threaded nut linked to the screw gear. Desirably, the threaded nut is a ball nut and the carriage comprises rollers for moving along the length of the bed.

The bed preferably comprises at least one downwardly depending bracket attached to a rear port ion of the bed and pivotally attached to a rear portion of a chassis of the vehicle. Desirably, the bed comprises two spaced-apart rails such as C-shaped channels which extend a portion of the length of a vehicle.

Advantageously, the means for pivoting the bed is operable to pivot the bed to a vertical lifting position in which an angle between a chassis of the vehicle and the bed is greater than 90 degrees. Desirably, the means for pivoting the bed comprises a pair of hydraulic cylinders attached at one end to the bed and attached at an opposite end to a chassis of the vehicle.

Preferably, the mast comprises two generally L-shaped members in which a first arm of the L-shaped members is pivotally attached to the carriage and in which a second arm of the L-shaped member is attached to two spaced-apart rails. Desirably, the rails are C-shaped channels. Advantageously, the means for pivoting the mast comprises a pair of hydraulic cylinders attached at one end to the carriage and attached at an opposite end to the mast.

In a preferred embodiment of the present invention, a trolley is movably mounted along said length of the mast and attached to the fork, and further provided with means for moving the trolley up and down the mast. Desirably, the means for moving the trolley comprises at least one hydraulic cylinder operably attached to the trolley and to at least one of the mast and the carriage. Advantageously, the present invention comprises means for rotating the fork about an axis substantially perpendicular to the mast.

Certain of the foregoing and related objects are also readily attained in a mechanism lifting and transporting containers on a vehicle in which the mechanism includes a bed pivotally attachable to a vehicle so that the bed is pivotable between a generally horizontal transporting position and a generally vertical lifting position, and means for pivoting the bed between the generally horizontal transporting position and the generally vertical lifting position. In addition, a carriage is movable along a length of the bed, a mast is pivotally attached to the carriage, and a fork is attached to the mast for engaging a container. Means for pivoting the mast is provided to maintain the mast in a generally vertical orientation when the bed is pivoted between the generally horizontal transporting position and the generally vertical lifting position. Also provided is means for lifting a container when the bed is in the generally vertical lifting position and for moving the carriage along the length of the bed to position a container thereon.

BRIEF DESCRIPTION OF THE DRAWINGS

Other objects and features of the present invention will become apparent from the following detailed description considered in connection with the accompanying drawings which disclose one preferred embodiment of the present invention. It should be understood, however, that the drawings are designed for the purpose of illustration only and not as a definition of the limits of the invention.

In the drawings, wherein similar reference characters denote similar elements throughout the several views:

FIG. 2 is an enlarged, partial side elevational view, with parts thereof broken away, of the vehicle for lifting and transporting containers shown in FIG. 1;

FIG. 4 is a cross-section of the ball nut and screw gear for moving the carriage;

DETAILED DESCRIPTION OF THE PREFERRED EMBODIMENTS

Figure 1:
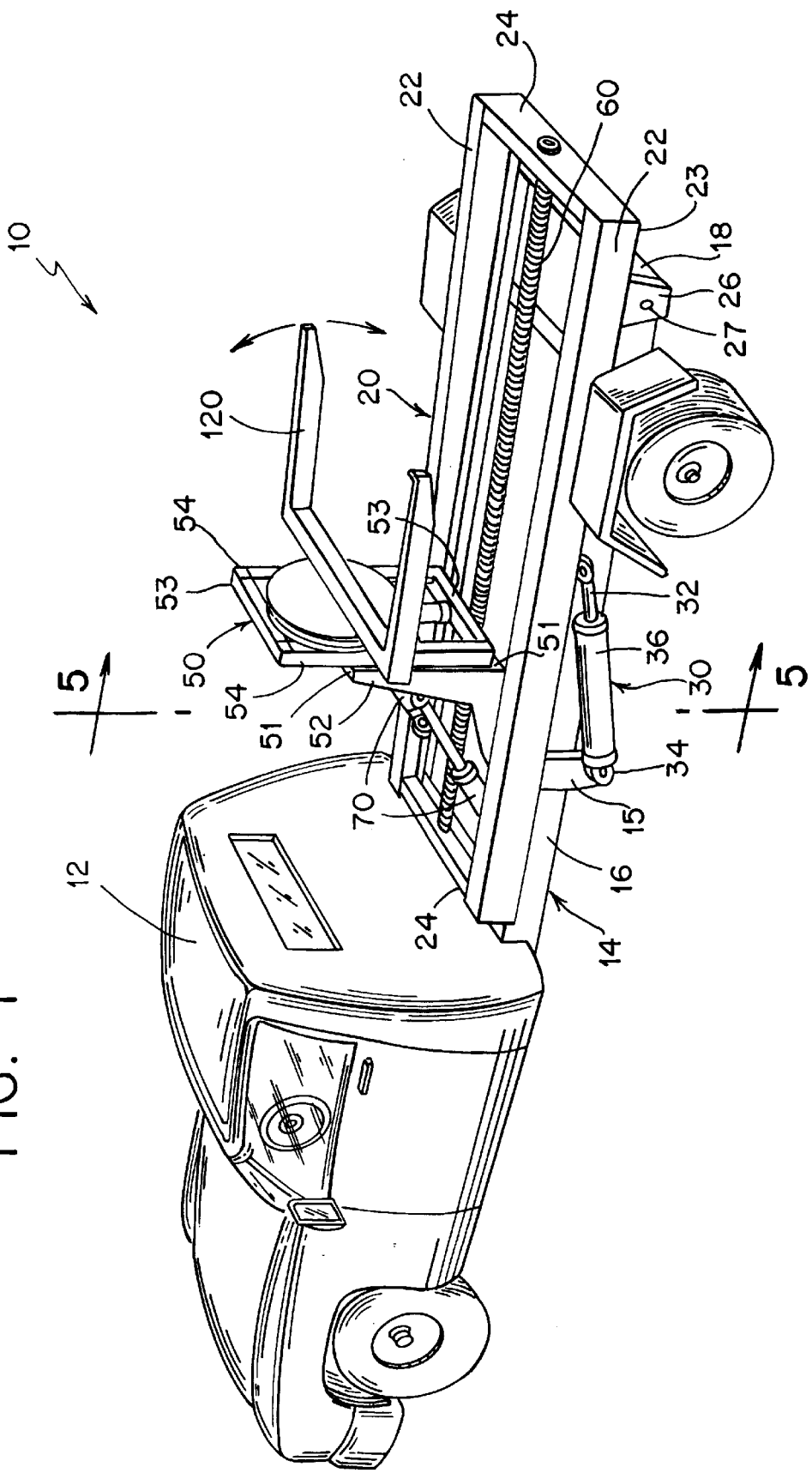
FIG. 1 is a perspective view of a vehicle for lifting and transporting containers embodying the present invention.

Referring now in detail to the drawings and in particular FIG. 1 thereof, therein illustrated is a vehicle embodying the present invention for lifting and transporting containers referred to generally by reference numeral 10. Specifically, vehicle 10 preferably includes a chassis 14 which is suitably constructed of a pair of longitudinal beams or members 16 (only one of which is shown) extending rearward from a cab 12 and joined by cross members 18 (only one of which is shown).

A bed 20 is pivotally attached to the rear end of chassis 14. In particular, bed 20 includes a pair of rails 22, preferably in the form of inwardly facing C-shaped channel members attached to and reinforced by cross members 24. C-shaped rails 22, each having a bottom flange 23 from the rear end of which downwardly depend a pair of spaced apart brackets 26 (only one of which is shown) which are positioned to the rear end of beams 14; brackets 26 may be suitably attached to the bottom flange 23 of C-shaped rails 22, e.g., by welding. A connecting pin 27 pivotally connects brackets 26 to the rear end of chassis 14 so that bed 20 can be pivoted between a generally horizontal transporting position as illustrated in FIG. 1 and a generally vertical lifting position as shown best in FIG. 6 and described in greater detail below.

With reference again to FIG. 1, a pair of hydraulic cylinders 30 (only one of which is shown), operably attach to the sides of bed 20 and to the sides of chassis 14. Specifically, a piston arm or end 32 of hydraulic cylinder 30 is suitably pivotally attached to bed 20 and end 34 of cylinder 36 is suitably pivotally attached to a bracket 15 (only one of which is shown) downwardly depending from generally the middle of chassis 14 of vehicle 12, e.g., by welding, riveting, bolting and the like.

Figure 3:
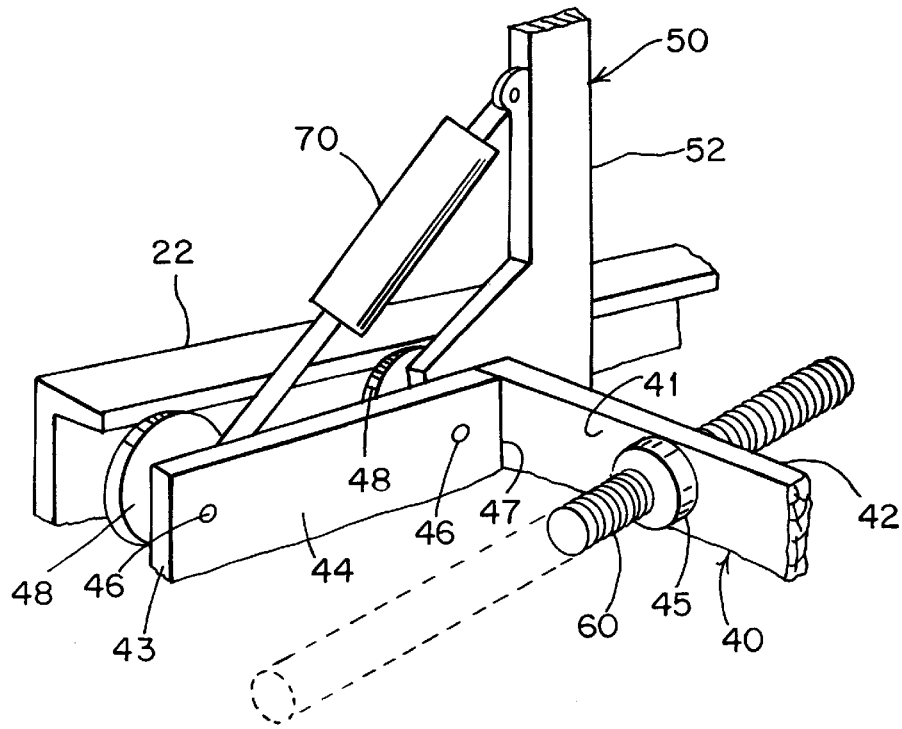
FIG. 3 is an enlarged perspective view, with parts thereof broken away, of the carriage and mast shown in FIG. 1.

With reference now to FIGS. 2–4, a carriage 40 and mast 50 are movable along C-shaped rails 22 along the length of bed 20 from a front position next to cab 12 (FIG. 1) to a rear position (FIG. 6) by means of a screw gear 60 which engages a threaded member 45 (FIG. 3) in carriage 40. Carriage 40 includes a cross-member 42 attached at each end 41 thereof to side members 44. Specifically, each end 43 and 47 of side members 44 attach to half axles 46 which support rollers 48 which, in turn, are received within and ride along flanges of C-shaped rails 22. As will be described in greater detail below, screw gear 60 of the present invention is used to both 1) lift a fully loaded container and 2) position the fully loaded container on bed 20.

Screw gear 60 is mounted for rotation at the front and rear cross members 24 (FIG. 1). The front end of screw gear 60 is suitably provided with a chain drive coupling it to a hydraulic motor controllable by a lever valve, which is described in greater detail in U.S. Pat. No. 5,391,043, the complete disclosure along with the complete disclosure of U.S. Pat. Nos. 4,778,327 and 4,943,203 are incorporated herein by reference. Those skilled in the art will appreciate that activation of the hydraulic motor through the valve causes screw gear 60 to rotate and therefor move carriage 40 supported by rollers 48 along C-shaped rails 22, either forward or backward, depending on the direction of rotation of screw gear 60. In order to provide a smooth transfer of rotational motion of screw gear 60 to longitudinal motion of carriage 40, threaded member 45 is preferably a ball nut having a plurality of ball bearings 49 as shown in FIG. 4.

Figure 5:
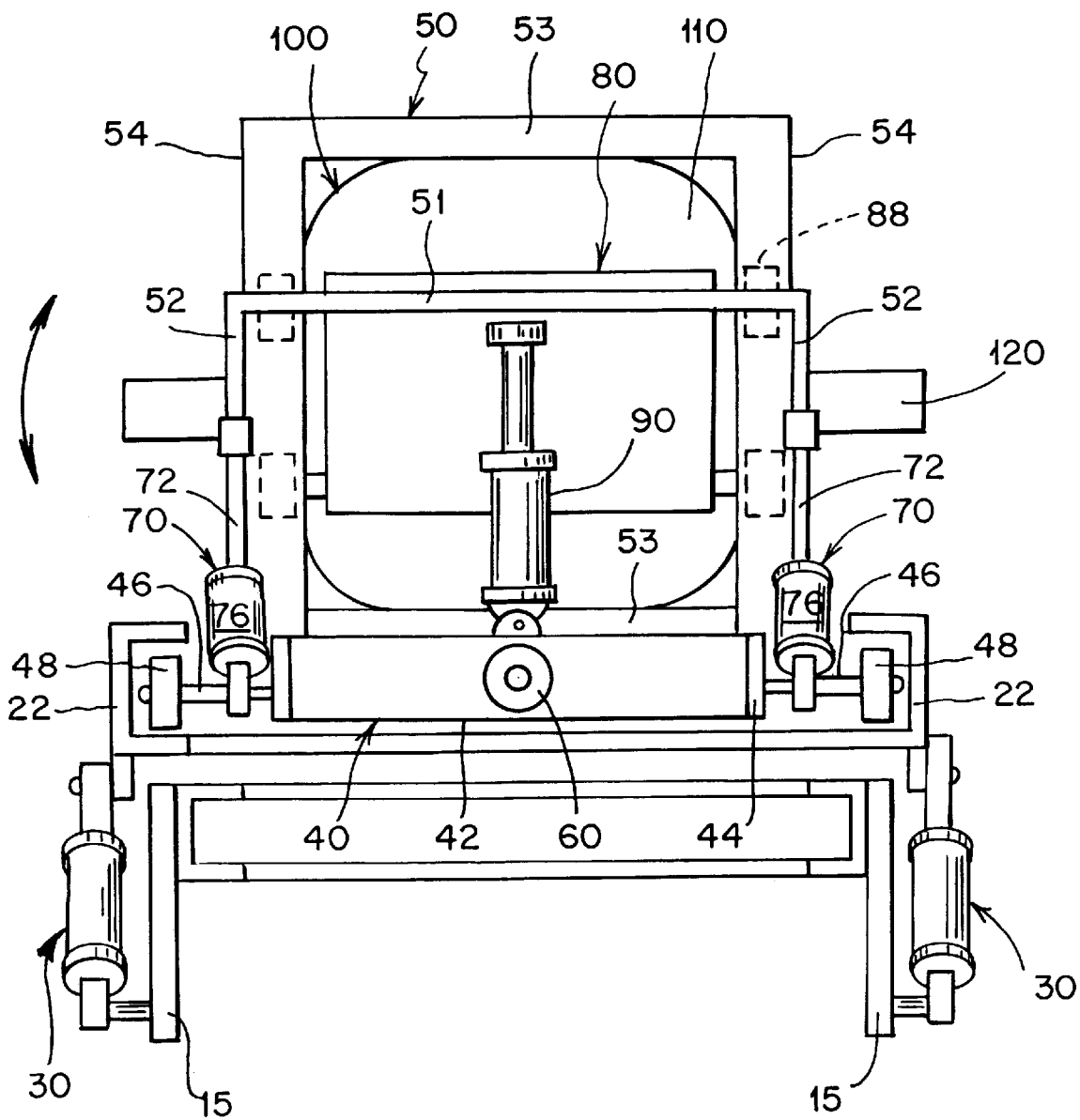
FIG. 5 is an enlarged elevational, in part section view taken in the direction of line 5—5 in FIG. 1.

As shown in FIG. 1, mast 50 includes a pair of generally L-shaped members 52, a pair of cross-members 51 attached thereto, and a pair of rails 54, preferably in the form of inwardly facing C-shaped channel members attached to and reinforced by cross-members 53. As shown in FIG. 5, a pair of hydraulic cylinders 70, each having a piston arm 72 which is pivotally coupled to L-shaped member 52 and having a cylinder 76 pivotally coupled to half axle 46 of carriage 40, serve to pivot L-shaped members 52 with respect to bed 20. Hydraulic cylinder 70 is suitably connected to flexible conduits which extend from hydraulic cylinder 70 where they are switchably coupled to a source of hydraulic pressure by a lever valve (not shown) which is described in greater detail in U.S. Pat. No. 5,391,043. Those skilled in the art will appreciate that operation of the valve will cause cylinder 70 to expand or contract thereby tilting mast 50 on half axles 46 either forward or backward.

As seen best in FIGS. 2 and 5, a fork adjusting trolley 80 is movable between rails 54 by action of a hydraulic cylinder 90 (FIG. 5). Trolley 80 is preferably a box frame structure having four wheels 88, two of which are attached to opposite sides of carriage 80, which ride between C-shaped rails 54. Attached to trolley 80 is a movable fork support 100. Hydraulic cylinder 90 is suitably connected to a flexible conduit through a lever valve to a source of hydraulic fluid (not shown). Those skilled in the art will appreciate that operation of the valve will move trolley 80 up or down which allows for minor adjustment of fork support 100 and, in turn, forks 120 for engaging the side of containers having a capacity typically ranging from two to ten cubic yards.

Fork support 100 carries a hydraulically operated rotator 110 such as the R6000 available from Container Bins, Inc. of Clackamas, Oregon. Fork 120 is securely mounted on rotator 110. Rotator 110 is fed by flexible conduits where they are coupled to a source of hydraulic fluid through a lever valve. Rotator 110 is capable of rotating the fork 360 degrees in either direction as shown by the curved arrows in FIG. 1.

Figure 6:
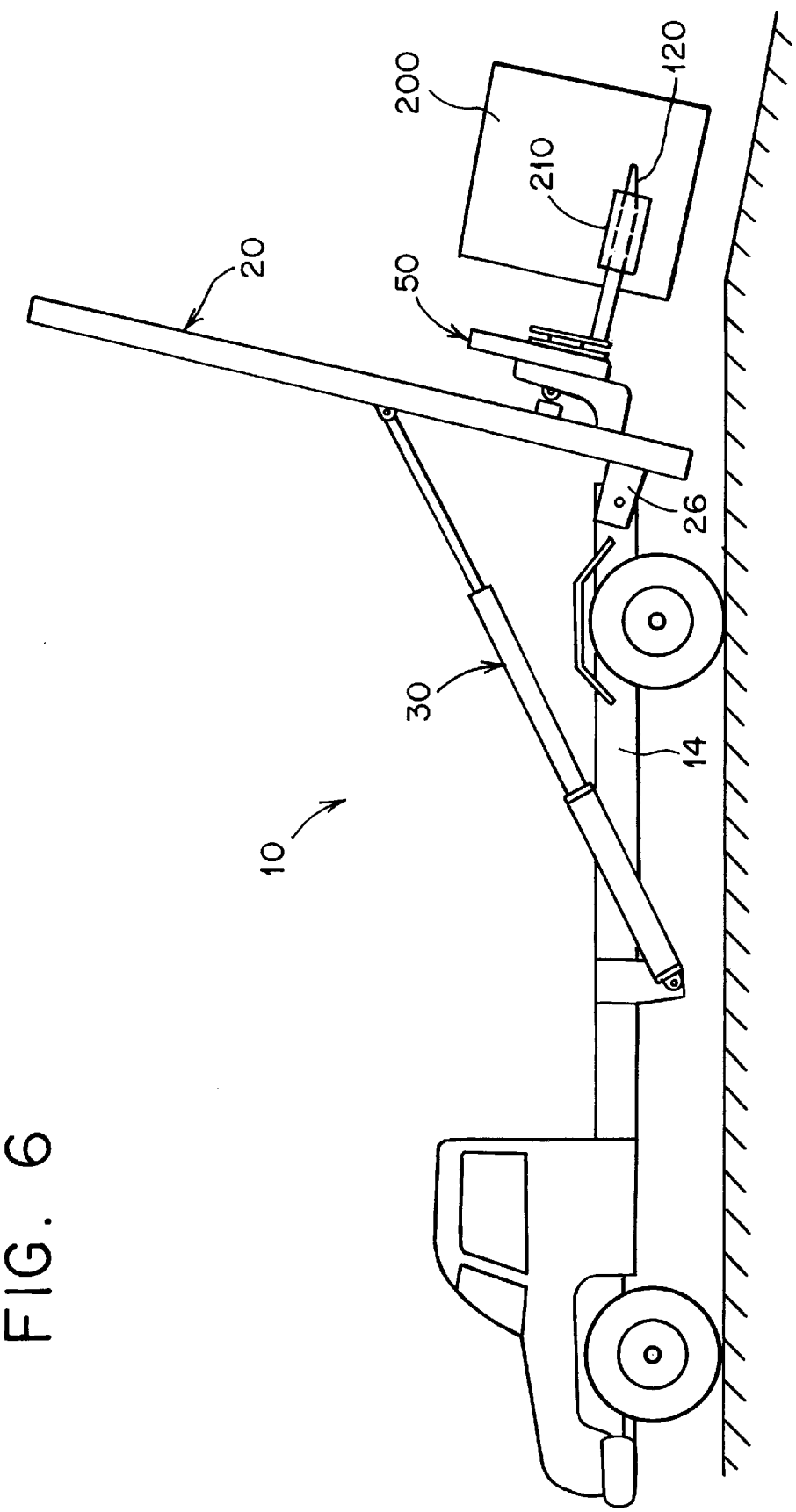
FIG. 6 is a side elevational view of the vehicle shown in FIG. 1 with the bed thereof in a generally vertical lifting position and a pair of forks (only one of which is shown) engaging and lifting a container.

When bed 20 is in vertical lifting position, as shown in FIG. 6, fork 120 can be lowered a substantial distance below chassis 14 and closer to the ground. In particular, because of the attachment of bed 20 to chassis 14 via bracket 26, bed 20 can be tilted so that fork 120 can reach down to a container 200 in a well or on a slope as shown. From the present description, it will be appreciated that this degree of articulation of bed 20 allows fork 120 to reach almost any kind of container. Moreover, after fork 120 engages side mounted sleeves 210 (only one of which is shown) of container 200, bed 20 is tilted forward to prevent container 200 from sliding off fork 120 while container 200 is being lifted. When fork 120 engages a container with sleeves, rotator 110 can be used to empty a trash container by rotating fork 120 more than 90 degrees in either direction so that the contents of the container spill out of the top thereof.

Figure 7:
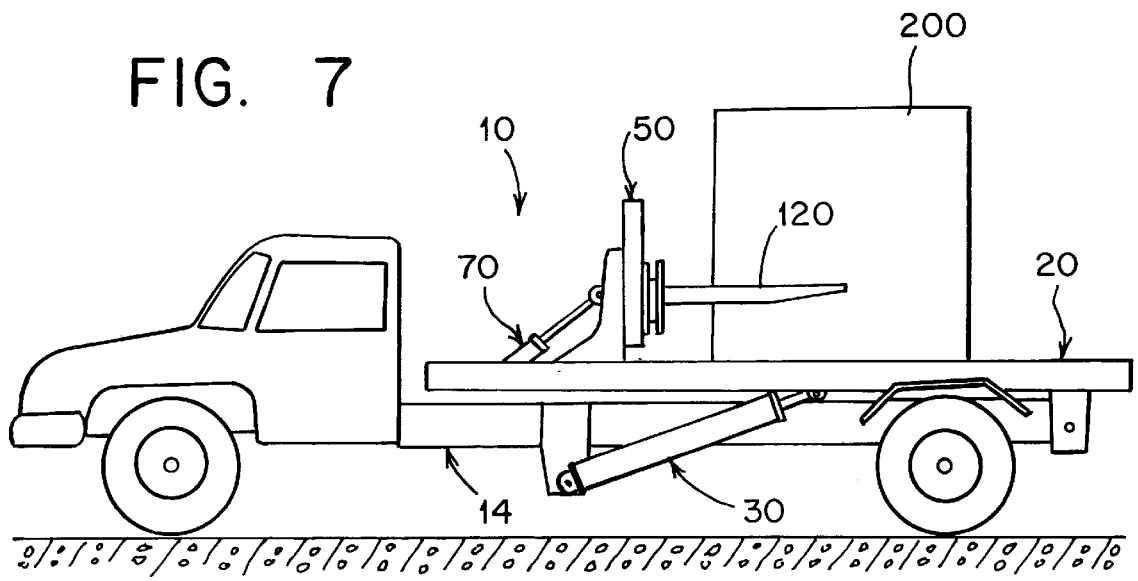
FIG. 7 is a side elevational view of the vehicle shown in FIG. 1 with the bed thereof in a generally horizontal transporting position and a container positioned thereon.

As mentioned above, vehicle 10 of the present invention is capable of lifting, rotating, and safely transporting containers having a two to ten cubic yard capacity, and which generally corresponds to loads of up to approximately 10,000 lbs. By operating hydraulic cylinder 30, hydraulic cylinders 70, and screw gear 60, container 200 can be safely lifted and positioned on bed 20 as shown in FIG. 7. From the present description of vehicle 10, use of a single screw means, e.g., screw gear 60, is operable to both 1) lift a fully loaded container and 2) position the fully loaded container safely on bed 20, thereby eliminating the necessity for two separate means with the complexity and costs associated therewith as taught in the prior art.

While particular hydraulic drive means have been disclosed, it will be appreciated that other types of drive means (e.g., electric motors) could be suitably utilized without departing from the spirit of the invention.

Finally, it should be appreciated that although the invention is specifically intended and useful for handling trash and refuse non-roller type containers, it could be used for lifting and transporting a wide variety of loads, such as waste oil, cable bodies, and grain, to name a few.

It will therefore be appreciated by those skilled in the art that yet other modifications could be made to the provided invention without deviating from its spirit and scope as so claimed.

What is claimed is:

1. A vehicle for lifting and transporting a container having a length and side mounted sleeves, said vehicle comprising:

a bed pivotally attached to the vehicle, said bed being pivotable between a generally horizontal transporting position and a generally vertical lifting position;

means for pivoting said bed between said generally horizontal transporting position and said generally vertical lifting position;

a carriage movable along a length of said bed;

a mast pivotally attached to said carriage;

a fork attached to said mast for engaging the side-mounted sleeves of the container;

means for pivoting said mast to maintain said mast in a generally vertical orientation when said bed is pivoted between said generally horizontal transporting position and said generally vertical lifting position; and single means for lifting the container when said bed is in said generally vertical lifting position and for moving said carriage along the entire length of said bed to position the entire length of the container along the length of said bed when said bed is placed in said horizontal position.

2. A vehicle according to claim 1, wherein said means for moving said carriage comprises a screw gear.

3. A vehicle according to claim 2, wherein said carriage comprises a threaded nut linked to said screw gear.

4. A vehicle according to claim 3, wherein said threaded nut comprises a ball nut.

5. A vehicle according to claim 1, wherein said carriage comprises rollers for moving along the length of said bed.

6. A vehicle according to claim 1, further comprising at least one bracket attached to a rear portion of said bed and pivotally attached to a rear portion of a chassis of the vehicle.

7. A vehicle according to claim 1, wherein said bed comprises two spaced-apart rails which extend a portion of the length of the vehicle.

8. A vehicle according to claim 7, wherein said rails comprise C-shaped channels.

9. A vehicle according to claim 1, wherein said means for pivoting said bed is operable to pivot said bed to a vertical lifting position in which an angle between a chassis of the vehicle and said bed is greater than 90 degrees.

10. A vehicle according to claim 1, wherein said means for pivoting said bed comprises a pair of hydraulic cylinders attached at one end to said bed and attached at an opposite end to a chassis of the vehicle.

11. A vehicle according to claim 1, wherein said mast comprises two generally L-shaped members, a first arm of said L-shaped members being pivotally attached to said carriage.

12. A vehicle according to claim 11, wherein said mast comprises two spaced-apart rails which are attached to a second arm of said L-shaped member.

13. A vehicle according to claim 12, wherein said rails comprise C-shaped channels.

14. A vehicle according to claim 1, wherein said means for pivoting said mast comprises a pair of hydraulic cylinders attached at one end to said carriage and attached at an opposite end to said mast.

15. A vehicle according to claim 1, further comprising a trolley movably mounted along said length of said mast and attached to said fork.

16. A vehicle according to claim 15, further including means for moving said trolley up and down said mast.

17. A vehicle according to claim 16, wherein said means for moving said trolley comprises at least one hydraulic cylinder operably attached to said trolley and to at least one of said mast and said carriage.

18. A vehicle according to claim 1, further comprising means for rotating said fork about an axis substantially perpendicular to said mast.

19. A mechanism attachable to a vehicle for lifting and transporting a container having a length and side-mounted sleeves, said mechanism comprising:

a bed pivotally attachable to the vehicle, said bed being pivotable between a generally horizontal transporting position and a generally vertical lifting position;

means for pivoting said bed between said generally horizontal transporting position and said generally vertical lifting position;

a carriage movable along a length of said bed;

a mast pivotally attached to said carriage;

a fork attached to said mast for engaging the side-mounted sleeves of the container;

means for pivoting said mast to maintain said mast in a generally vertical orientation when said bed is pivoted between said generally horizontal transporting position and said generally vertical lifting position; and single means for lifting the container when said bed is in said generally vertical lifting position and for moving said carriage along the entire length of said bed to position the entire length of the container along the length of said bed when said bed is placed in said horizontal position.

20. The mechanism according to claim 19, wherein said means for moving said carriage comprises a screw gear.

* * * * *